US006588605B1

(12) United States Patent
Volkert et al.

(10) Patent No.: US 6,588,605 B1
(45) Date of Patent: Jul. 8, 2003

(54) PLANAR ARTICLE RACK HAVING CLOSEABLE HOLDING MEMBERS

(75) Inventors: Vern W. Volkert, Northfield, MN (US); Charles E. Groth, Northfield, MN (US); Douglas F. Cox, Dundas, MN (US)

(73) Assignee: Cardinal CG Company, Eden Pairie, MN (US)

( * ) Notice: Subject to any disclaimer, the term of this patent is extended or adjusted under 35 U.S.C. 154(b) by 0 days.

(21) Appl. No.: 10/060,419

(22) Filed: Jan. 30, 2002

(51) Int. Cl.[7] .................................................. A47F 7/00
(52) U.S. Cl. ..................... 211/41.14; 206/449; 206/454
(58) Field of Search .............................. 211/41.14, 195, 211/41.1; 206/449, 454

(56) References Cited

U.S. PATENT DOCUMENTS

| | | |
|---|---|---|
| 619,237 A | 2/1899 | Soule |
| 2,884,136 A | 4/1959 | Leighton |
| 2,946,453 A | 7/1960 | Pityo |
| 2,953,253 A | 9/1960 | Henderson et al. |
| 3,047,142 A | 7/1962 | Heffley |
| 3,147,860 A | 9/1964 | Kean, Sr. et al. |
| 3,193,093 A | 7/1965 | Hansen |
| 3,199,709 A | 8/1965 | Morrison et al. |
| 3,402,845 A | 9/1968 | Eriksson |
| 3,645,387 A | 2/1972 | Hunt |
| 3,655,034 A | 4/1972 | Stollman et al. |
| 3,887,071 A | 6/1975 | Thomaswick |
| 3,913,965 A | 10/1975 | Muller et al. |
| 3,955,676 A | 5/1976 | Hansen et al. |
| 4,093,251 A | 6/1978 | Boyer |
| 4,177,907 A | 12/1979 | Funaioli et al. |
| 4,202,452 A | 5/1980 | McCormick |
| 4,278,171 A | 7/1981 | Millhoan |
| 4,467,922 A | 8/1984 | Rowley |
| 4,512,473 A | 4/1985 | Thomaswick et al. |
| 4,619,368 A * | 10/1986 | Kappelt .................. 206/449 X |
| 4,733,781 A | 3/1988 | Gerlach |
| 4,785,936 A * | 11/1988 | Shpigelman ................. 206/454 |
| 4,836,379 A | 6/1989 | Shaw |
| 4,934,538 A | 6/1990 | Beyer |
| 5,101,976 A * | 4/1992 | Salisbury ..................... 206/454 |
| 5,145,073 A | 9/1992 | Kitagawa et al. |
| 5,439,716 A | 8/1995 | Larsen |
| 5,676,066 A | 10/1997 | Cavalier et al. |
| 5,685,437 A | 11/1997 | Lisec |
| 5,803,257 A | 9/1998 | Bartholomew |
| 5,813,536 A | 9/1998 | Bartholomew |
| 6,102,206 A | 8/2000 | Pride |

* cited by examiner

*Primary Examiner*—Robert W. Gibson, Jr.
(74) *Attorney, Agent, or Firm*—Fredrikson & Byron P.A.

(57) ABSTRACT

A shipping container for holding a plurality of parallel panels, the shipping container including a floor, a generally upright rear wall, and a frame supporting the floor and the rear wall at right angles to each other for vertically supporting the parallel panels. The edges of the panels can be supported by the floor and rear wall, with the panels being supported in parallel planes perpendicular to the planes of the rear wall and floor. The floor can have numerous parallel grooves for receiving the panel edges and numerous upwardly protruding holding members slidably disposed along a direction transverse to the floor grooves and received panel edges. The holding members can have a relaxed position for permitting removal of the panels and the gripping position for inhibiting movement of the panels. One shipping container has three sets of holding members each slidably disposed along a direction transverse to the floor grooves and received panel edges, with one of the three sets being disposed on an opposite side of the received panel edge, for holding the received panel edge therebetween. Each set of holding members can be coupled to a respective transverse carrying member, wherein the holding member can be more pliable and resilient than the carrying member. In some shipping containers, the transverse carrying members are slid transversely by being operably coupled to cams disposed and carried on a camshaft. The shipping containers provide secure, releasable containment of various sizes of glass panels in the same container, together with simultaneous release of multiple panes.

23 Claims, 12 Drawing Sheets

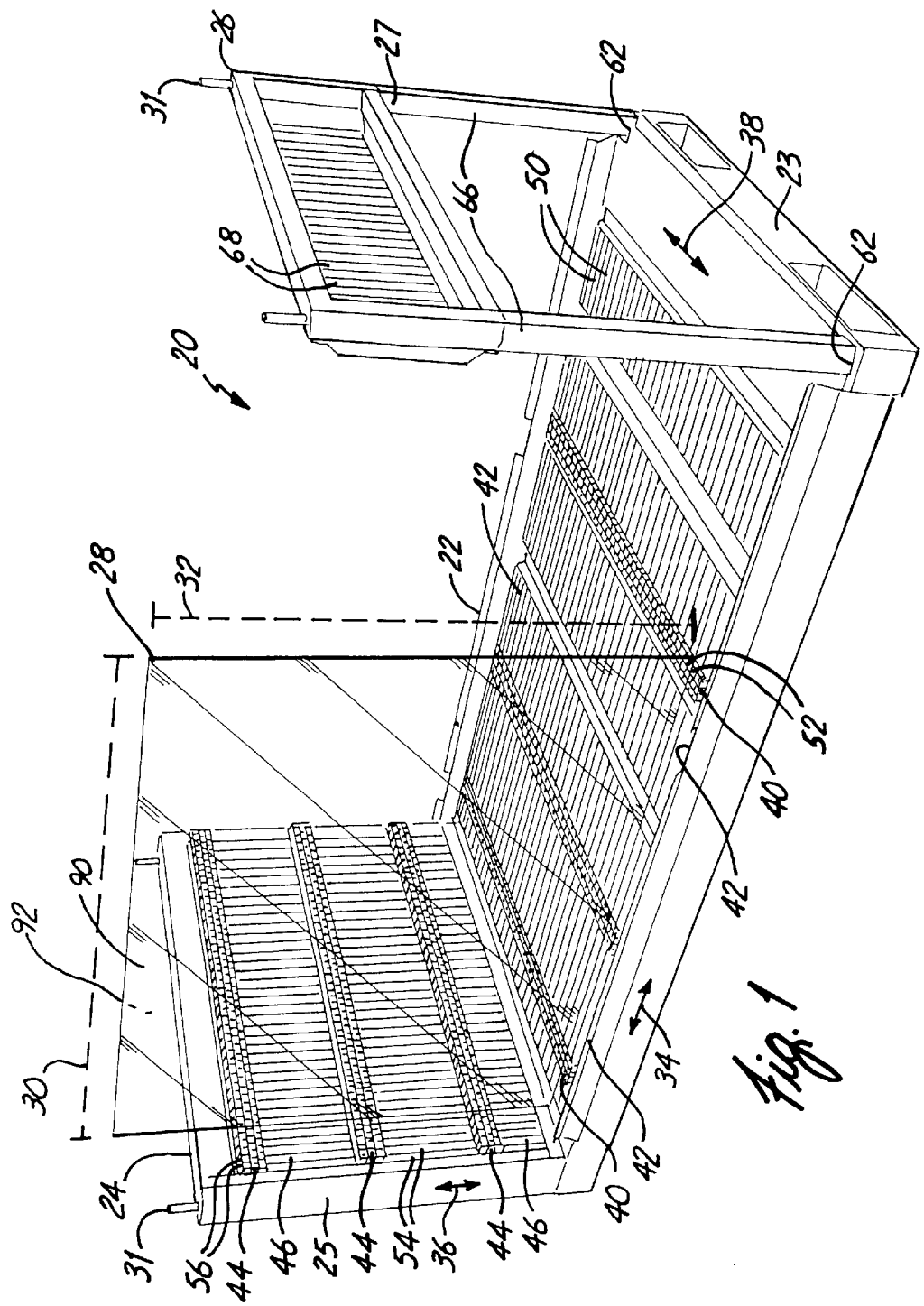

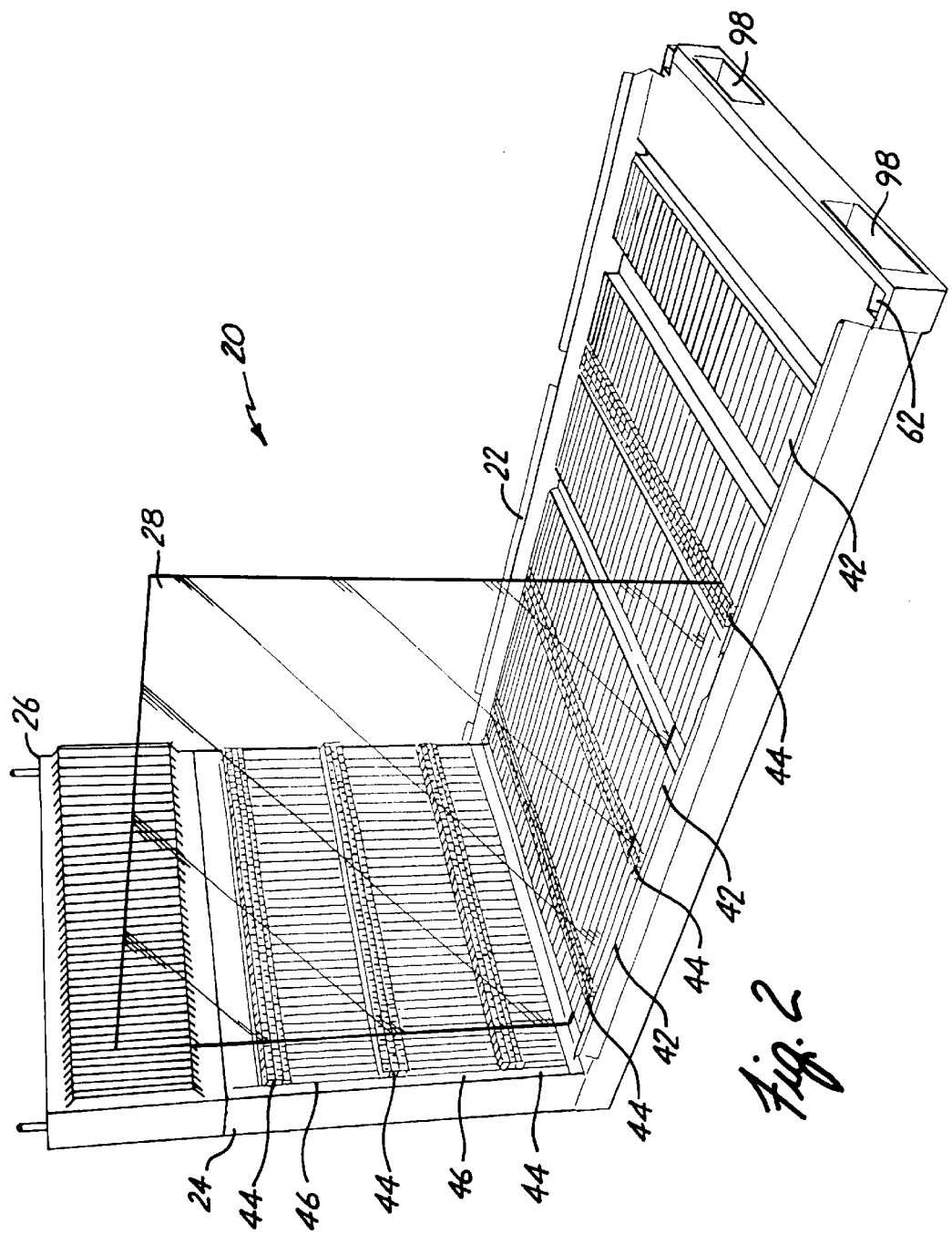

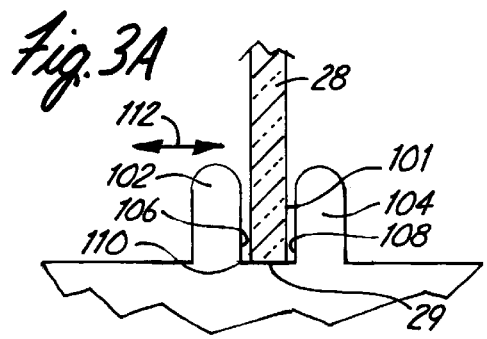
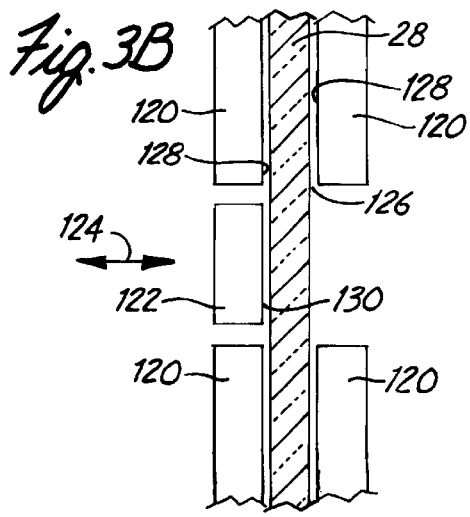
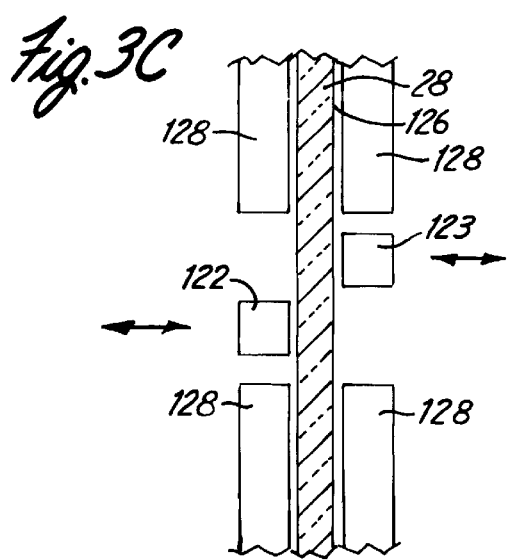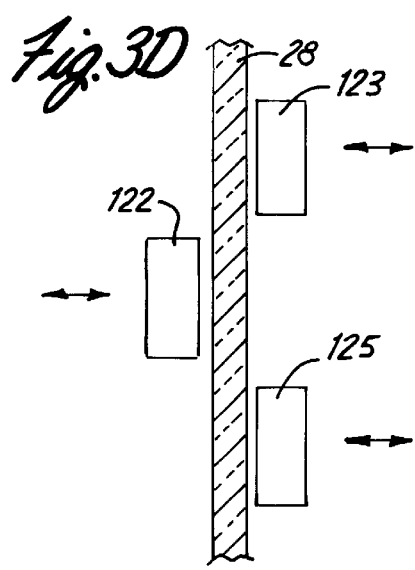

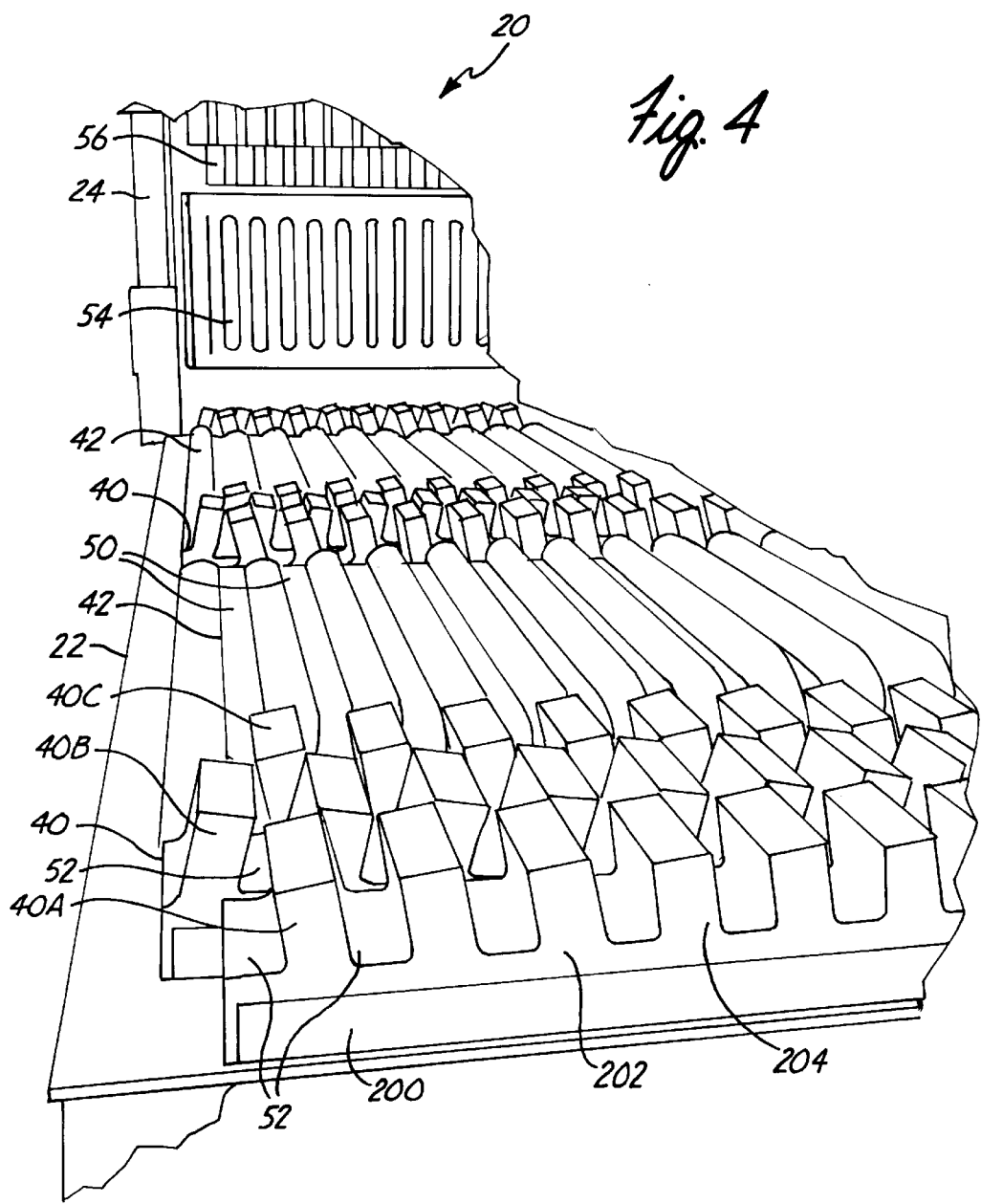

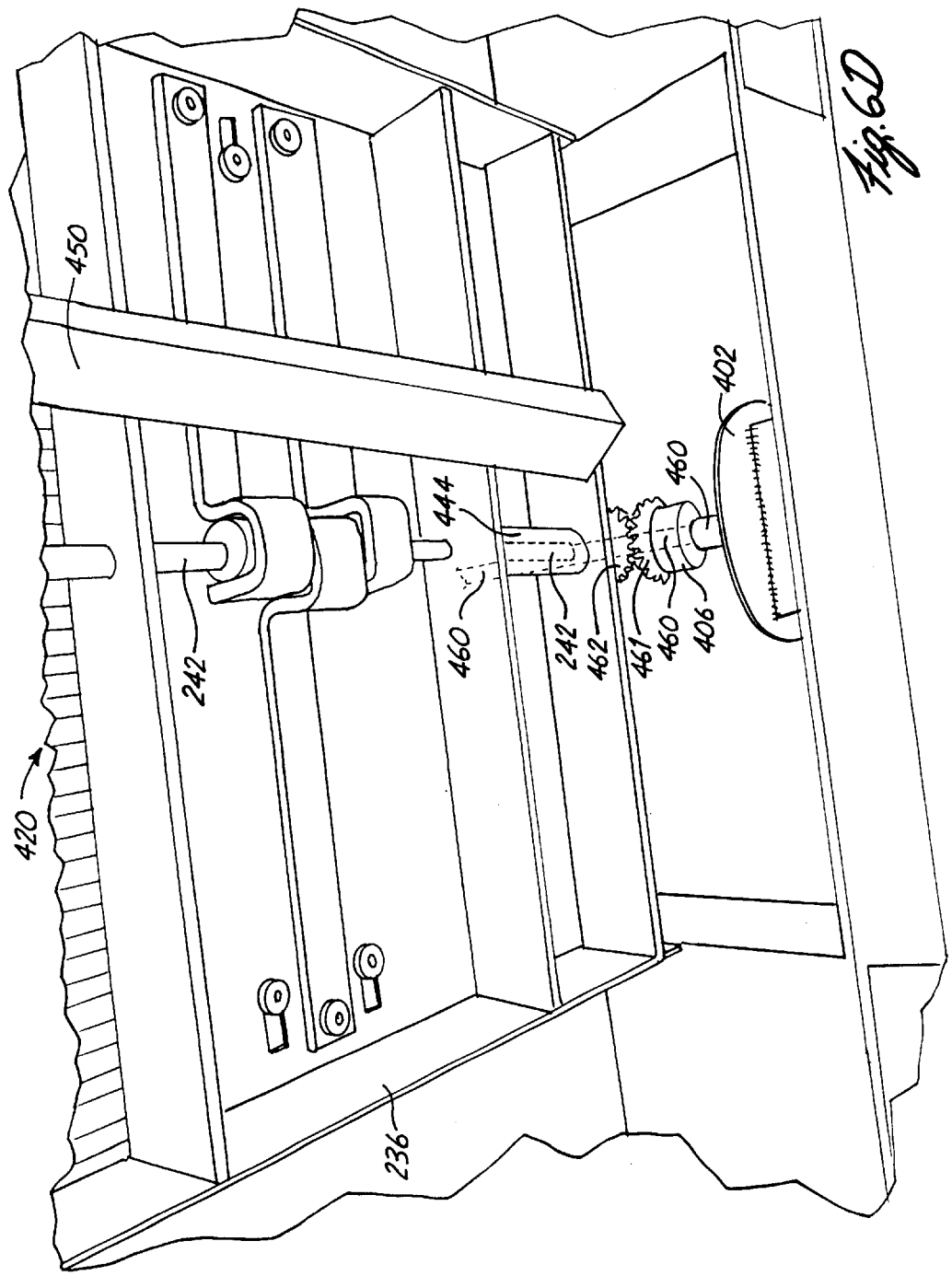

PLANAR ARTICLE RACK HAVING CLOSEABLE HOLDING MEMBERS

FIELD OF THE INVENTION

The present invention relates generally to shipping containers and storage containers. More specifically, the present invention relates to containers for securely supporting panels, which can include glass pane panels.

BACKGROUND OF THE INVENTION

Insulating glass units employed in windows and doors commonly are manufactured by sandwiching a peripheral spacer between aligned, parallel sheets of glass. One such construction is shown in Larsen, U.S. Pat. No. 5,439,716. The finished units are packaged and shipped to another location in which the glass units are provided with appropriate frames to form finished windows and doors. The insulating glass units, to which frames will be attached, often are produced to fill specific orders which may call for a variety of different sized units to be produced. To fill a particular order, pairs of individual glass panes are collected and stored in an appropriate rack so that the pane pairs can be readily accessed.

During the assembly operation, the pane pairs are provided with a peripheral spacer that spaces the panes from one another, the between-pane space being filled with air or other insulating gas such as argon. One pair of panes may be of a given size, whereas the next pair of panes may be larger or smaller, as the order requires. Once the pane pairs have been assembled to form insulating glass units, these units then are transported to a framing operation where the appropriate frames are applied. Here, also, one insulating glass unit may be of a given size whereas the next unit may be larger or smaller as required by the order.

A problem arises in the transportation of the individual glass panes, and of the insulating glass units formed by pane pairs. To support vertically aligned glass sheets against breakage during transportation, various containers have been proposed. One such container, referred to as a "harp" rack, comprises a floor, an end wall supported at right angles to the floor, and a series of parallel, curved rods extending from an upper edge of the wall to a lower, forward edge of the floor, the rods being spaced from one another by a distance enabling glass sheets to be inserted between the rod pairs. Although containers of this type are appropriate for conveying vertically aligned glass sheets for very short distances, as across the flat floor of a factory, they are quite inadequate to support glass units against breakage during shipment when the containers are subjected to bumps and jolts, since the individual glass units can move upwardly and forwardly parallel to their planes as well as from side-to-side. The container itself, as described, can be wrapped horizontally with a heat-shrinkable plastic film in an effort to stabilize the sheets, but if sheets of different sizes and shapes are intermingled, only the larger sheets will be supported.

U.S. Pat. No. 6,102,206 provides a shipping container which supports each glass panel against movement in its plane, and additionally enables articles of different sizes and shapes to be positioned next to each other in a predetermined order. The shipping container allows individual articles to be inserted and removed without disturbing the other articles. A received panel has one corner disposed near the intersecting floor and rear wall of the container, with an opposite, free corner being diagonally opposite the first corner. The free corner is generally secured with an elastic, resilient, elongated restraint. The elongated elastic restraints are typically each brought to bear at a free corner of the inserted glass panel. The elongated elastic restraints, while highly advantageous, must typically be individually secured and released from the free corners of the glass panels.

What would be advantageous is a shipping container not requiring the individual securing and releasing of each contained panel, but rather providing for simultaneous securing and releasing of each and all contained panels.

SUMMARY OF THE INVENTION

The present invention provides a shipping container for holding a plurality of parallel panels, where the panels have a length dimension, a height dimension, and a width disposed orthogonally to the length and height dimensions, with the panels having parallel major surfaces terminating at peripheral side edges. The shipping container can include a floor, a generally upright rear wall, and a frame supporting the floor and rear wall in planes that intersect at approximately a right angle for vertically supporting the plurality of parallel panels with the edges of the panels being supported by the floor and rear wall. The panels can be supported in parallel planes that are perpendicular to the planes of the rear wall and the floor.

Shipping containers according to the present invention can have one or more sets of grippers mounted along the floor and/or rear wall to support and releasably grip the edges of the panels. The gripper have a gripping position for inhibiting movement of the panels and a relaxed position for permitting removal of the panels. The grippers can provide for gripping and/or releasing of multiple panels at the same time, not requiring securing and releasing each panel individually. A shipping container can have sets of rigid, stationary or immobile grooves along the floor and/or rear wall which can also capture and support the panel peripheral edges. In some embodiments of the invention, the grippers are formed of one or more sets of outwardly protruding holding members which bear against the sides of the received panels edges transversely, so as to force the panels sideways against immobile grooves and/or other, opposing holding members which may also bear upon the received panels from the opposite direction. In some embodiments, the holding members are formed of a softer, pliable material than the rigid portions of the floor and rear wall.

In some embodiments, the floor has a plurality of parallel bottom grooves for receiving the panel edges along the panel length, the grooves being disposed along the longitudinal dimension. The floor can also have a first plurality of upwardly protruding bottom holding members slidably disposed along a direction transverse to the bottom grooves and received panel edges. The plurality of bottom holding members can have a relaxed position for permitting removal of the panels and a gripping position for inhibiting movement of the panels.

In some shipping container embodiments, the floor further includes a second plurality of bottom holding members, also slidably disposed along a direction transverse to the bottom grooves and received panel edges. The second plurality of bottom holding members can also have a relaxed position for permitting removal of the panels and the gripping position for inhibiting movement of the panels. The first and second plurality of bottom holding members can be disposed on opposite sides of the panel edges, with the first and second bottom holding members being disposed closer together in the gripping position than in the relaxed position. Preferably, the first and second plurality of bottom holding members are longitudinally offset from each other, rather than directly opposed. In other embodiments, the first and second plurality of bottom holding members are respectively coupled to first and second transverse bottom carrying members transversely and slidably disposed along the floor.

In a preferred embodiment of the invention, three sets of bottom holding members are coupled respectively to three transverse bottom carrying members transversely and slidably disposed along the floor, wherein the first, second and third transverse carrying members have a first position for urging the holding members into the relaxed position and a second position for urging the holding members in to the gripping position. In some embodiments, the first, second and third transverse bottom carrying members are operably coupled to a mechanical linkage such as a longitudinally disposed camshaft, with the first, second and third transverse carrying members being respectively operably coupled to first, second and third cams. The first, second and third cams can be carried on the longitudinally disposed camshaft such that rotating the camshaft in a first direction urges the first, second, and third transverse carrying members to a relaxed position away from confronting peripheral surfaces of a panel, and rotating the camshaft in the second direction urges the first, second, and third transverse carrying members to the gripping position. Here, the first and third carrying members may move together, that is, in unison, in the same direction while the second carrying member, sandwiched between the others, moves in the opposite direction.

In one embodiment, the rear wall also includes similar, side holding members for releaseably holding the received panel edges along the rear wall. In another embodiment, the shipping container includes a removable front wall. The front wall can be removed and at least partially received within the rear wall. The rear wall is adapted to receive the removed front wall, such that setting the front wall atop the rear wall extends the height of the rear wall.

One shipping container includes three rows of grippers along each of the floor and rear wall. Each of the sets of grippers can include three sets of transversely moveable holding members for bearing on opposite sides of a received panel edge. Individual, transversely moveable carrying members are supportably coupled to each of the sets of holding members. The transversely moveable carrying members can be operably coupled to rotatable cams carried on a camshaft. One shipping container includes a first, longitudinal camshaft disposed under the floor and a second, vertical camshaft disposed behind the rear wall. The camshafts can be rotated with respective handles for manually opening and closing the grippers. The invention thus provides a container for releasably securing holding panels, for example, glass panels of various sizes within the same sized container. Multiple glass panels can be secured and/or released along one edge simultaneously.

DESCRIPTION OF THE DRAWINGS

FIG. 1 is a perspective view of a shipping container or rack having a floor, a rear wall, a front wall or extension, and a glass panel contained within;

FIG. 2 is a perspective view of the shipping container of FIG. 1, having the front wall or extension added atop the rear wall;

FIG. 3A is a highly diagrammatic, fragmentary, transverse cross-sectional view of a gripper holding panel;

FIG. 3B is a highly diagrammatic, fragmentary, top view of one gripper according to the present invention, including a transversely moveable holding member;

FIG. 3C is a highly diagrammatic, fragmentary, top view of another gripper according to the present invention, including two, offset and opposed, transversely movable holding members, FIG. 3D is yet another highly diagrammatic, fragmentary, top view of a gripper according to the present invention, including three opposed, transversely movable holding members;

FIG. 4 illustrates a fragmentary, end, perspective view of the shipping container of FIG. 2, having opposed, transversely movable holding members disposed between immobile floor grooves or slots;

FIG. 6D is a perspective, detailed view of the pinion gear, of FIG. 6C;

DETAILED DESCRIPTION OF THE PREFERRED EMBODIMENT

Figure 5:
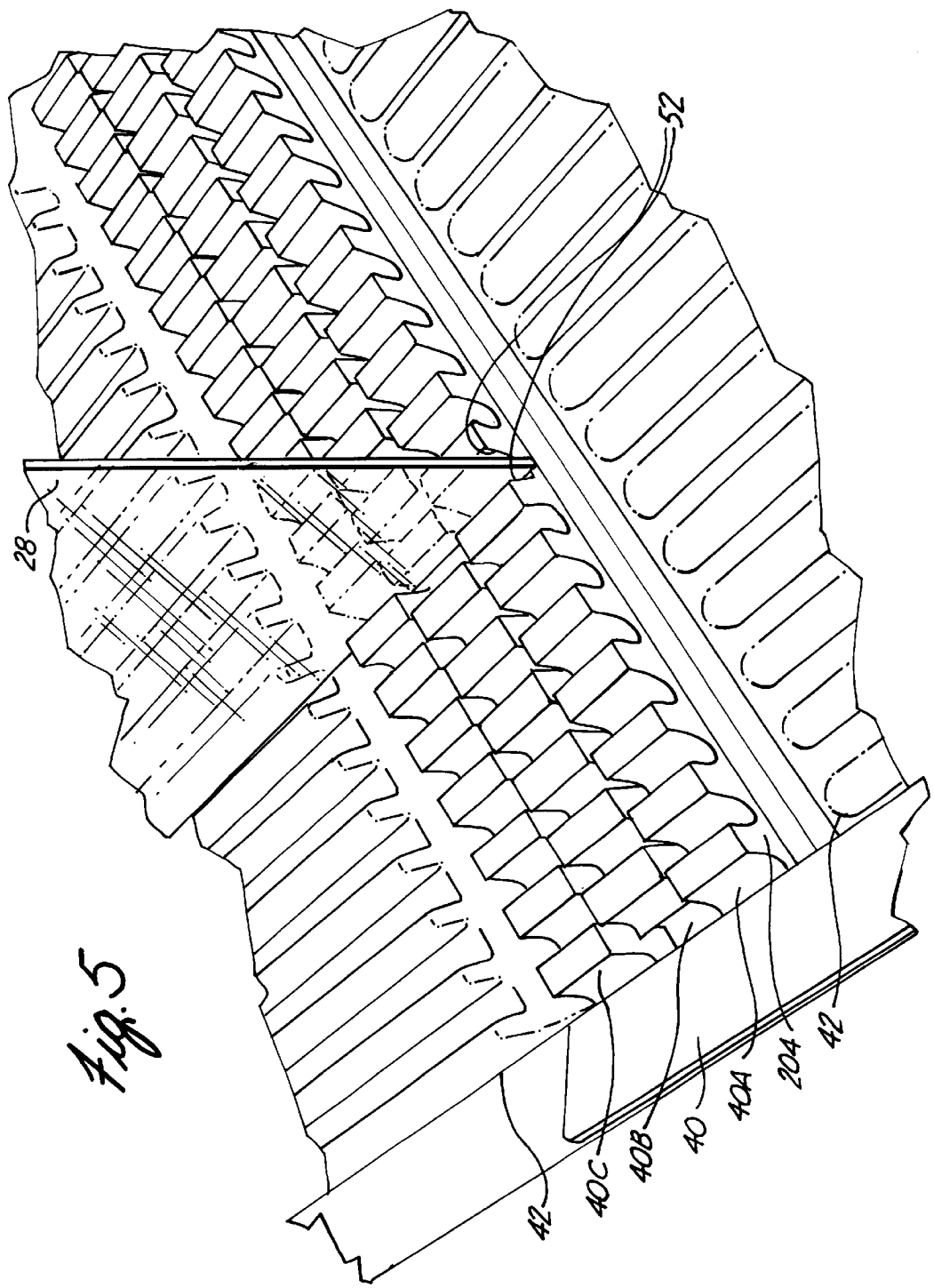
FIG. 5 is a fragmentary, perspective view of a glass panel disposed within one immobile slotted region and one moveable gripping region, as illustrated in FIG. 4.

The following detailed description should be read with reference to the drawings, in which like elements in different drawings are numbered identically. The drawings, which are not necessarily to scale, depict selected embodiments and are not intended to limit the scope of the invention. Several forms of invention have been shown and described, and other forms will now be apparent to those skilled in art. It will be understood that embodiments shown in drawings and described above are merely for illustrative purposes, and are not intended to limit scope of the invention as defined in the claims which follow.

FIG. 1 illustrates a shipping container or rack 20 having generally a floor 22, an upright rear wall 24, and an upright front wall or extension wall 26. Floor 22 is supported by a frame 23, and rear wall 24 is supported by a rear wall frame 25. Front wall or extension 26 is supported by a frame 27. Frame 27 includes posts 66 which are slidably received within holes 62 in frame 23. Stacking posts 31 may be seen atop rear wall 24 and front wall 26. Stacking posts 31 can be used to stack the glass racks on top of each other, where the stacking posts can be received within the bottom portion of a rack positioned above.

A glass panel 28 may be seen contained within shipping container or rack 20. Glass panel 28 has generally a length as indicated at 30, and a height as indicated at 32. Glass panel 28 also has a width or thickness. Glass panel 28 may be considered to have a first major surface 90 and a parallel second major surface 92. Rack 20 has generally a longitudinal dimension as indicated at 34, a vertical dimension along rear wall 24 as indicated at 36, and a transverse dimension along floor 22 as indicated at 38.

Floor 22 may be seen to have multiple sets of grippers 40 which may releasably hold panel edges carried within rack 20. Rack 20 includes ridged or grooved bottom surfaces 42 which can be immobile and disposed between bottom grippers 40. In one embodiment, floor 22 has immobile floor or bottom grooves or slots 50 within immobile side walls in the immobile slotted floor region 42, and also bottom grooves or slots 52 disposed within the moveable or closeable grippers 40. The panels or glass panels may be received within both grooves or slots 50 and 52.

Rear wall 24 may be seen to have numerous sets of stationary, immoveable side grooves or slots 54 within immobile side slotted region 46, and numerous side slots or grooves 56 within moveable or closeable side grippers 44 also carried on the back wall. Front wall or extension 26 may also be seen to have slots or grooves 68, shown from the rack front in FIG. 1. In the example illustrated, glass panel 28 may be seen to be higher than upright rear wall 24.

Referring now to FIG. 2, rack 20 is further illustrated, having front wall or extension 26 removed from frame mounting holes 62, and inserted atop rear wall 24. The slots or grooves 68 within extension 26 are further illustrated. Holes or apertures 98 may also be seen in FIG. 2, which can be used to receive the tines of a forklift. As may be seen from inspection of FIG. 2, extension 26 now renders the rear wall higher than glass panel 28.

Referring now to FIG. 3A, a gripper according to the present invention is illustrated generally. A glass panel 28 may be seen disposed within a groove or slot 101 formed between a first upright or upwardly protruding holding member 102 and a second upright or upwardly protruding holding member 104. First upward holding member 102 may be seen to have an inward surface 106 and second upwardly protruding holding member 104 may be seen to have a inward surface 108. Glass panel 28 may be seen to have an edge 29 held within groove or slot 101 formed between inward surfaces 106 and 108. Glass panel edge 29, in the embodiment illustrated, may be seen to rest on floor 110. In various embodiments of the invention, upwardly protruding holding member surfaces 106 and 108 may both travel inwardly toward glass panel 28 in some embodiments, and have only one inward surface travel inwardly in other embodiments. Travel of first upward holding member 102 is indicated by a transverse travel arrow 112 in FIG. 3A.

Referring now to FIG. 3B, a highly diagrammatic illustration of another gripper is shown. Glass panel 28 may be seen from a top view, as disposed within a groove 126 formed between longitudinally disposed immobile upwardly protruding members 120. A single, moveable, upwardly protruding holding member 122 is also illustrated, adapted to travel in the transverse direction to hold glass panel 28, as indicated at 124. Immobile, upwardly protruding members 120 may be seen to have an inward surface 128, and movable holding member 122 may be seen to have an inward surface 130. The transverse movement of moveable holding member 122 may be seen to urge inward surface 130 against glass panel 28, thereby forcing an glass panel 28 against immobile holding member inward surface 128.

Referring now to FIG. 3C, glass panel 28 is disposed within groove or slot 126 between immobile holding members 128. Transversely slidable holding member 122 is illustrated as in FIG. 3B. In the embodiment of FIG. 3C, a second transversely moveable holding member 123 is also illustrated. Transversely slidable holding members 122 and 124 may be seen to close in on glass panel 28 from opposite or opposed directions. In the embodiment illustrated, first slidable holding member 122 and second slidable holding member 123 are longitudinally offset from each other.

Referring now to FIG. 3D, glass panel 28 is illustrated as disposed between three transversely slidable holding members. Holding members 122 and 123 are as discussed previously, with respect to FIG. 3C. In this, preferred embodiment, a third transversely slidable holding member 125 is included. Outer or outside holding members 123 and 125 may be seen to be urged against glass panel 28 on a first major surface while first transversely slidable holding member 122 may be seen to be urged against a second major surface of glass panel 28, opposed to the other, parallel major surface. The three, upward holding members may be seen to form a stable support for glass panel 28. In a preferred embodiment, immobile upward holding members such as immobile upward holding members 128 of FIG. 3C are also included. In an alternate embodiment, the three transversely slidable holding members 122, 123, and 125 alone are used to secure glass panel 28, within the groove or slot formed between the opposed transversely slidable holding members.

In preferred embodiments of the invention, within a gripper, both sides of the gripper are moveable toward the panel held within, from opposite sides. Approaching the gripped panel from both sides requires less or no transverse movement of the panel. In racks having an engaging bottom surface, such as rubber, forcing a glass panel transversely can impart stress to the panel near the periphery, as the edge may be stationary, and the moving gripper may apply force to the glass panel within the periphery, above the edge. When both sides of a gripper move toward the glass sheet, the sheet may have to move much less, if at all. In embodiments having resilient grippers, even if the glass sheet is not perfectly centered, both gripper sides may be able to apply force to grip the sheet without requiring transverse movement of the sheet.

FIG. 4 illustrates an end, perspective view of shipping container or rack 20 including floor 22 and rear wall 24. Floor 22 may be seen to have immobile, bottom slotted regions 42 and bottom gripper regions 40. Immobile regions 42 may be seen to have bottom grooves 50 disposed along the longitudinal direction, and, in the embodiment illustrated, grippers 40 may be seen to be formed of a set of transversely slidable, upwardly protruding holding members. Grippers 40 include a first transversely slidable set of holding members 40A, a second transversely slidable set of upward holding members 40B, and a third transversely slidable set of upward holding members 40C. Slidable holding members 40A, 40B, and 40C may be seen to have longitudinally oriented grooves 52 formed between upwardly protruding members or fingers 204. Slidable holding members 40A may be seen, in the embodiment illustrated, to be formed of a flexible substrate or material 202 formed over a more rigid, slidable transverse carrying member 200. In one embodiment, fingers or upward members 204 are formed of a pliable, resilient, rubber material, and the more rigid slidable support member 200 is formed of a metal, for example, steel. The bottom grooves 52 formed between upward holding members 204 may be seen to be aligned with the bottom grooves 50 formed in the immobile holding portions 42 on rack floor 22.

Grooves 52, and other slots and groves in the present invention may have different dimensions in various embodiments. In one embodiment, the grooves and slots of the present invention are sized to fit individual glass panes. In another embodiment, the grooves and slots are sized to accept insulating glass units composed of a pair of spaced glass panes and a peripheral spacer. Some embodiments have closeable grippers which have an open position large enough to accept insulating glass units, and a closed position small enough to firmly hold the peripheral edge of a single glass pane.

The grooves or slots according to the present invention preferably have groove or slot walls that engage the inserted panels near or adjacent the panel edge or periphery. The panel periphery may be considered to be a zone or margin near the panel edge. The periphery may be considered to extend no more than about 8, 6, and 4 inches from the panel edge, in various embodiments of the invention. In particular, where the slots extend between moveable holding members of a gripper, the grippers preferably extend no higher than about 8, 6, or 4 inches from the panel edges, in various embodiments of the invention.

Inspection of FIG. 4 shows that transversely slidable gripping portions 40A, 40B, and 40C may be opened and closed so as to increase and decrease the width of groove 52 formed between upward holding members 204. Grippers 40 may thus be switched between an open or relaxed position and a closed or gripping position. A panel, for example, a glass panel, may be visualized as extending entirely through bottom grooves 52 and bottom grooves 50, extending back to rear wall 24, into fixed or immobile side grooves 54 and closeable side grooves or slots of 56. Inspection of FIG. 4 also illustrates that inner gripper row 40B has upward holding members 204 inclined rightward, and outer slidable gripper rows 40A and 40C are angled leftward. Rows 40A, 40B, and 40C are thus inclined to hold a glass panel disposed within grooves 52. In some embodiments, upward holding members 204 are formed of a sufficiently pliant material so as to significantly straighten upon being urged against a glass panel disposed within grooves 52 after the grippers 40 are switched to a closed or gripping position.

Referring now to FIG. 5, glass panel 28 may be seen disposed within bottom slots 50 of immobile slotted floor portion 42 and bottom groove or slot 52 formed between fingers or upward holding members 204. Transversely slidable gripping rows 40A, 40B, and 40C are as previously discussed with respect to FIG. 4. In the embodiment illustrated, inner gripping row 40B and outer gripping rows 40A and 40B have been urged together to capture and support the peripheral edges of glass panel 28. Immobile grooved region 42 may be seen to include an unused portion to the front of glass panel 28. The unused portion of grooved region 42 illustrates the flexibility of the present invention, allowing for various sized pieces of glass to be carried in the same rack.

Figure 6A:
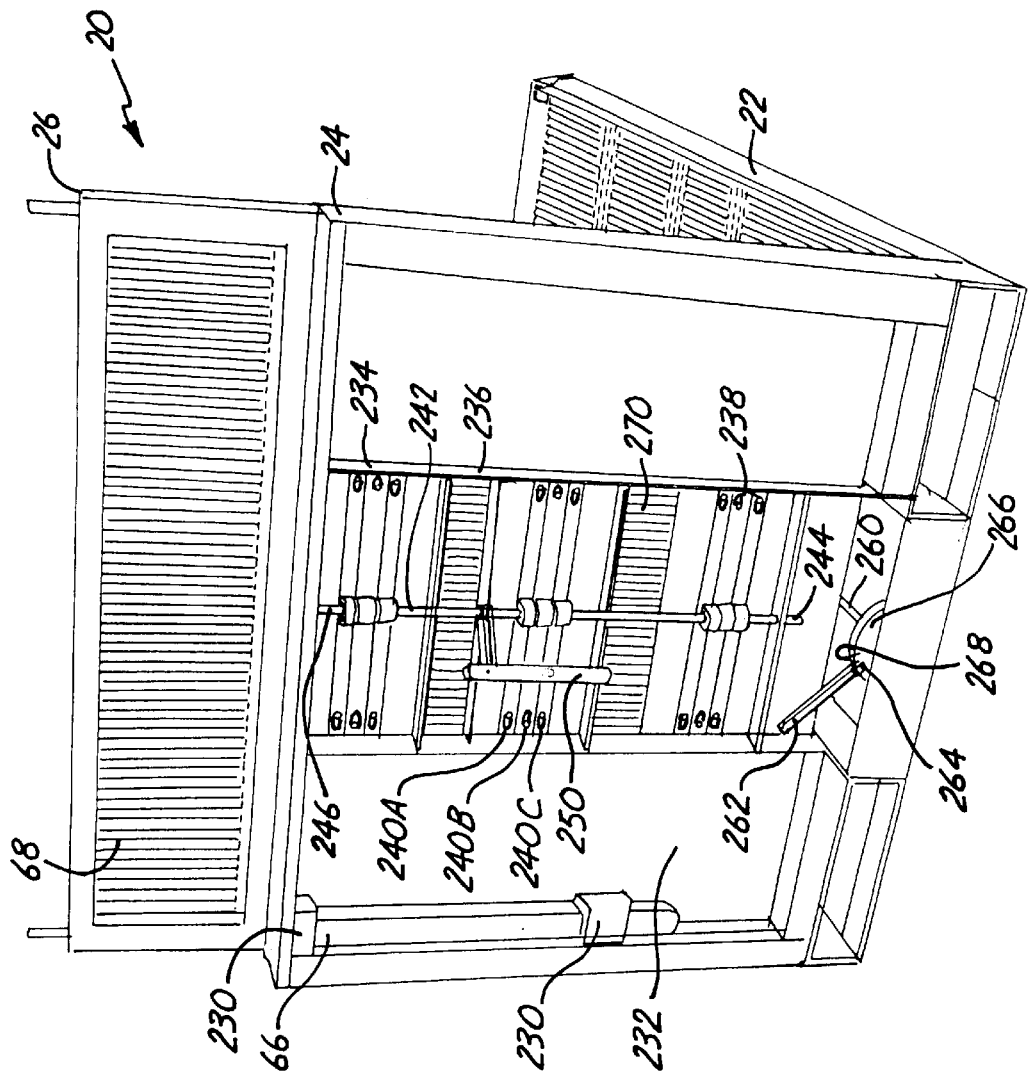
FIG. 6A is a perspective view of the shipping container of FIG. 2, viewed from the rear.

FIG. 6A is a perspective view of shipping container 20 as seen from the rear. Shipping container 20 includes rear upright wall 24 having front wall or extension 26 inserted atop the rear wall. Post 66 of front wall or extension 26 may be seen to be received within receiving brackets or angle irons 230. Container 20 has generally a rear frame assembly 232, including a top gripper control assembly 234, a middle gripper control assembly 236, and a lower gripper control assembly 238. A vertical camshaft 242 may be seen extending between a top journal 246 and a bottom journal 244, and coupled to a handle 250 for rotating camshaft 242. In the embodiment illustrated, each of the gripper control assemblies includes a top transversely slidable portion 240A, a middle transversely slidable portion 240B, and a lower transversely slidable control portion 240C. The middle, transversely slidable control portion 240B forms the inner slidable portion, and portions 240A and 240B form the outer slidable portions. Each of the gripper control assemblies 234, 236 and 238 control the opening and closing of the transversely moveable gripping portions on the rear wall of container 20. Each of the slidable portions 240A, 240B, and 240C, can control an individual row of protruding holding members, as discussed with respect to FIG. 4 and FIG. 5.

A lower, horizontal camshaft 260 may be disposed under floor 22, and coupled to a handle 262. In the embodiment illustrated, handle 262 is a spring-biased, pivoted scissor member handle having a jaw 264 for releaseably engaging teeth 268 in a locking wheel 266. Handle 262 may be used to rotate lower camshaft 260 to the desired position, and then locked into position. In one embodiment, vertical camshaft 242 also has a locking wheel and handle assembly, not shown to better illustrate container rear frame 232. A rear side grooved portion 270 of rear wall 24 is visible in FIG. 6A, visible between control assemblies 234, 236, and 238.

Figure 6B:
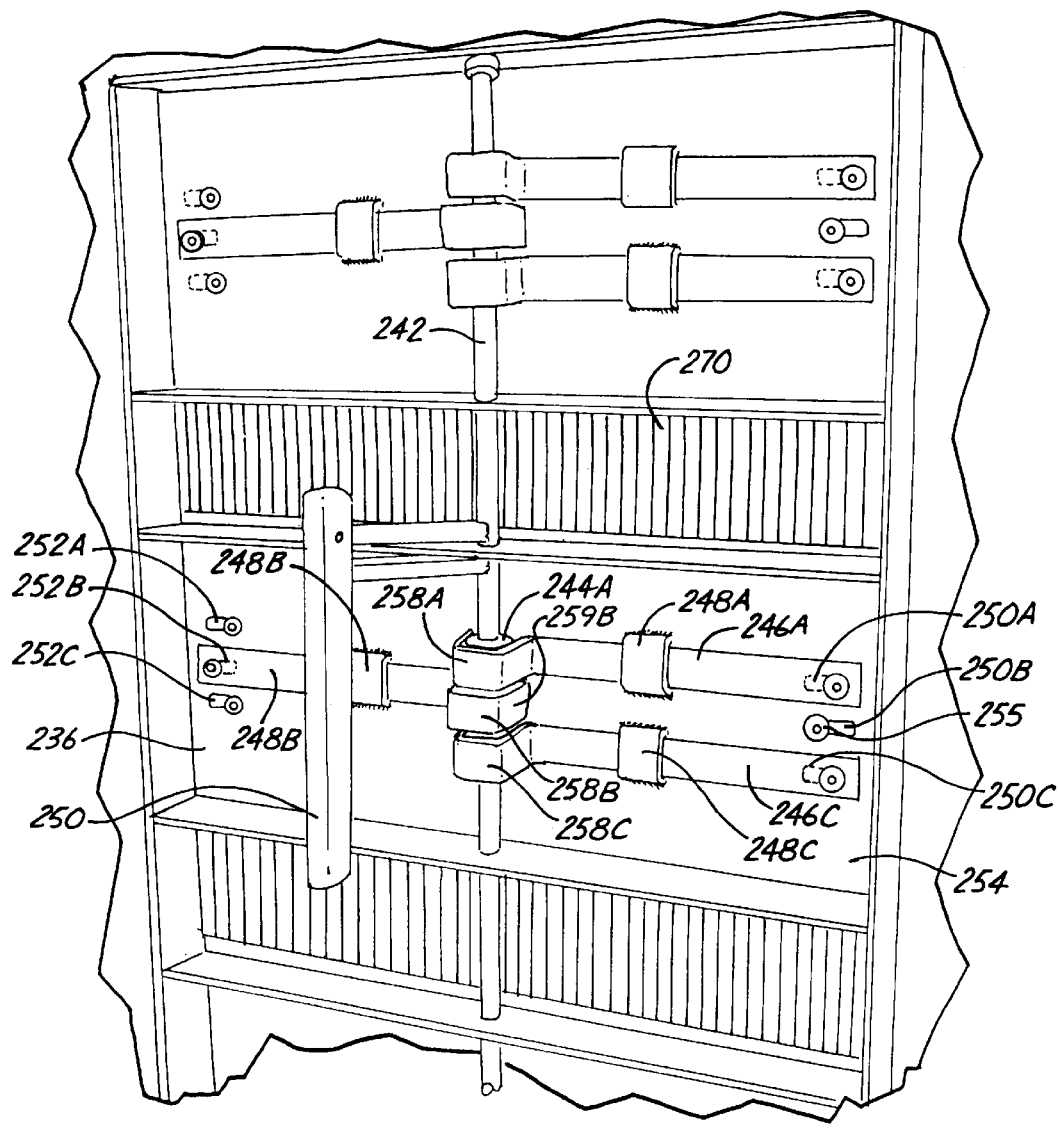
FIG. 6B is a fragmentary, perspective view of the rear of the container of FIG. 6A, showing the middle gripper control assembly in further detail.

Referring now to FIG. 6B, middle gripper control assembly 236 is illustrated in further detail. Gripper control assembly 236 includes generally slidable control portions 240A, 240B, 240C, as introduced in FIG. 6A. Control assembly 236 may be considered to have at least three layers, proceeding from outward to inward, proceeding from the rear toward the inside of the container. Control assembly 236 includes an upper, transversely slidable control arm 246A, a middle, transversely slidable control arm 246B, and a lower transversely slidable control arm 246C. Slidable control arms 246A, 246B, and 246C may be seen to be slidably received within mounting brackets 248A, 248B and 248C, respectively. Mounting bolts 255 may be seen extending through slidable control arms 246A, 246B, 246C. A mounting plate layer 254 may be seen to be disposed beneath slidable control arms 246A, 246B, 246C. Mounting plate 254 may be seen to have slots 250A, 250B, and 250C formed to the right of mounting plate 254. Slots 250A and 250C are shown in phantom, as they are beneath slidable control arms 246A and 246C.

Similarly, on the left side of control assembly 236, slots 252A, 252B, and 252C, are formed through mounting plate 254. A top cam 244A may be seen secured to vertical camshaft 242, with middle and lower cams 244B and 244C not visible in FIG. 6B. Control arm 246A may be seen to include an arcuate portion 258A extending to the far side of cam 244A. Similarly, control arms 246B and 246C may be seen to include arcuate portions 258B and 258C, respectively, extending to the far side of the enclosed cam. Middle control arm arcuate portion 258B may be seen to include a far extent, as indicated at 259B. Portion 259B may be understood to slide freely over mounting plate 254, not being fixed to mounting plate 254. Control arms 246A, 246B and 246C may be seen to function as cam follower elements, being slid to the left and to the right by the urging of the off-center cams included within the arcuate extending portions of the control arms.

Included beneath mounting plate 254 is a rigid, slidable, carrier for carrying the moveable holder members. An example of a slidable carrier material is seen in carrier 200 in FIG. 4, for carrying flexible fingers or holding members 204. Carrier 200 can be secured to bolts 255. In one example, carrier 200 is fixedly attached to bolt 255, extending through a longitudinal slot 250A and fixedly attached to control arm 246A. The rotation of vertical camshaft 242A thus rotates off-center or non-circular cam to 244A against arcuate control arm portion 258A, thereby sliding control arm 246A through bracket 248A. The sliding control arm 248A, being coupled to bolt 255 and through mounting plate 254 to carrier 200, may thus move carrier 200 from left to right along the length of slot 250A, thereby moving holding fingers 204 left and right. Control arms 246B and 246C can operate in a similar fashion. Rotating vertical camshaft 242 using handle 250 can thus open and close, or grip and relax, the holding members about the panel articles held within the grooved or slotted surfaces of the rear wall of container 20.

Figure 6C:
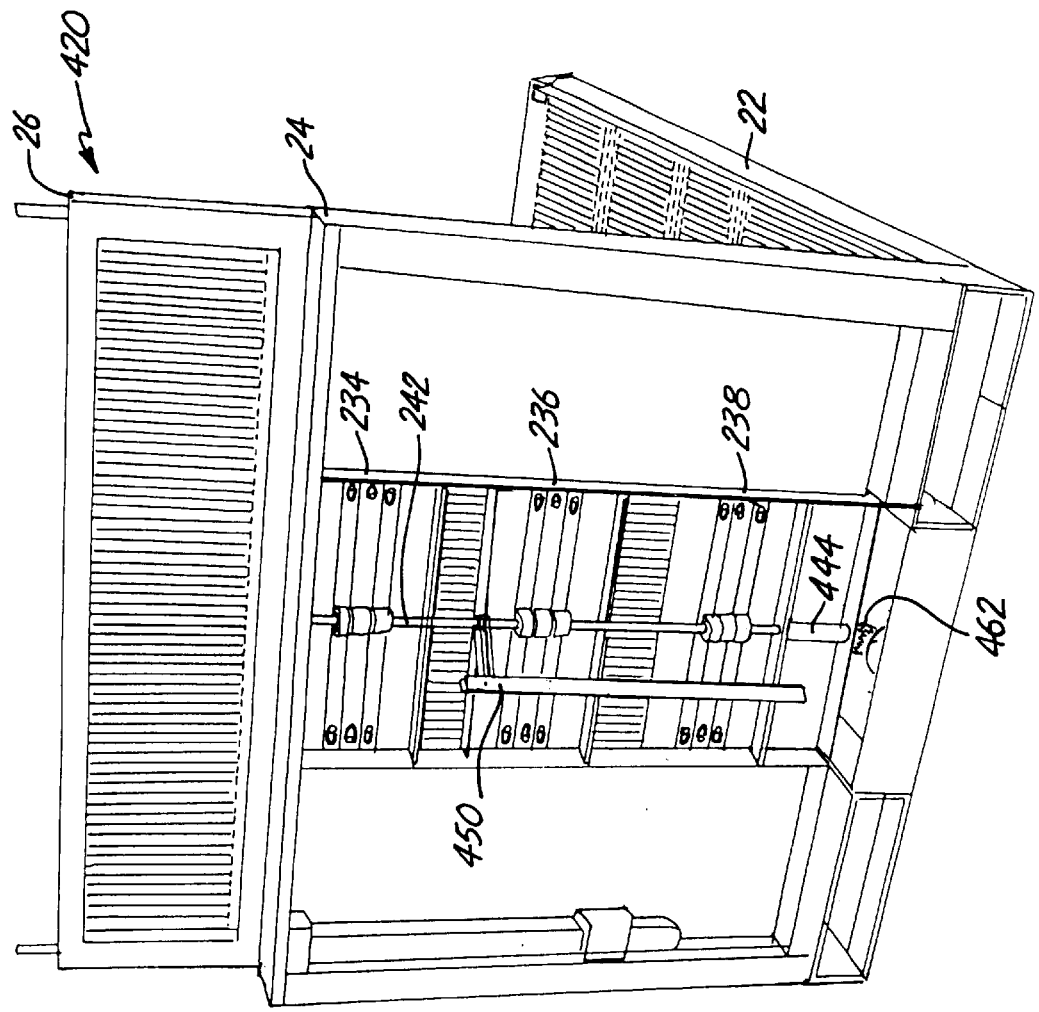
FIG. 6C is a perspective view of a shipping container similar to that of FIG. 6A, but having the horizontal cam shaft coupled to the vertical cam shaft through pinion gears.

Referring now to FIGS. 6C and 6D, another shipping container for 420 is illustrated in a perspective view similar to that of FIG. 6A. Shipping container 420 is similar to shipping container 20 of FIG. 6A, but having a longer handle, and having the horizontal and vertical cam shafts coupled together through pinion gears. Shipping container 420 includes upright rear wall 24, extension 26, and floor 22. The rear frame assembly of shipping container 420 includes top gripper control assembly 234, middle gripper control assembly 236, and lower gripper control assembly 238, as previously discussed with respect to FIG. 6A.

A long handle 450 may be seen coupled to vertical cam shaft 242. Vertical cam shaft 242 can be rotatably received within a sleeve or bearing 444, allowing the vertical cam shaft to extend down to a vertical cam shaft pinion gear 462. FIG. 6D illustrates vertical cam shaft 242 being received within sleeve or bearing 444. A horizontal cam shaft 460 can be fixed to a collar 406 which can in turn be coupled to a horizontal cam shaft pinion gear 461. Horizontal cam shaft 460 preferably rotates freely relative to plate 402, and can extend within a cavity in plate 402 in some embodiments. Rotating vertical cam shaft 242 may be seen to rotate pinion gear 462, thereby rotating pinion gear 461, and horizontal cam shaft 460. In this way, handle 450 may be used to rotate both the vertical cam shaft 242 and horizontal cam shaft 460, thereby closing grippers on both the rear wall and floor of shipping container 420.

Figure 7:
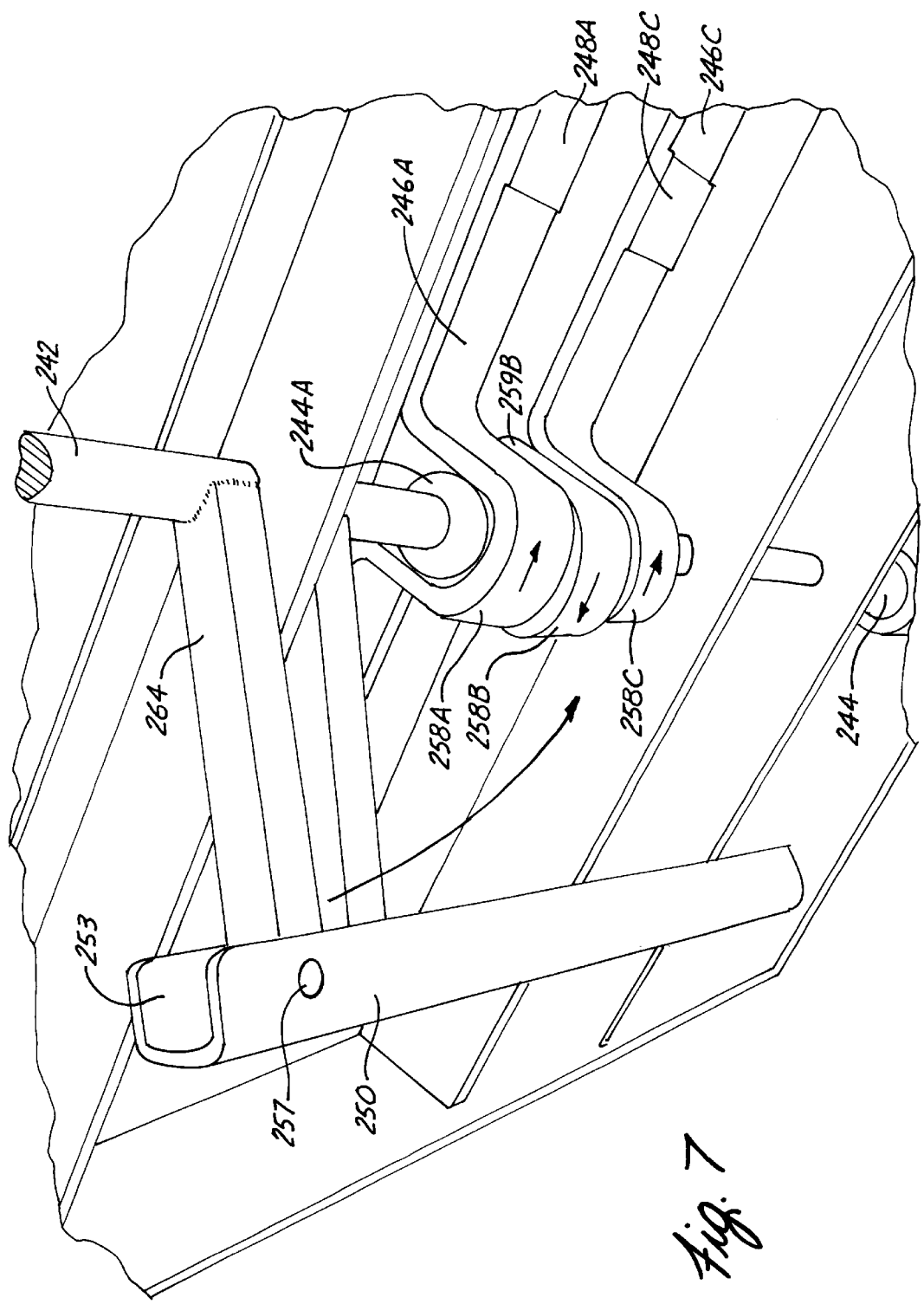
FIG. 7 is a fragmentary, perspective view of the handle, camshaft, upper cam, and central control arm regions of FIG. 6B.

Referring now to FIG. 7, handle 250 may be seen to include a channel 253 for receiving a lever arm 264 when handle 250 is pivoted about pivot 257. Handle 250 may thus be folded into a more compact position for shipping. Upper control arm 246A is illustrated, with arcuate portion 258A extending around to the far side of upper cam 244A. Cam 244A may be seen to be disposed off-center relative to vertical camshaft 242. Control arms 246A, 246B, and 246C may be understood to slide relative to mounting plate 254.

Figure 8:
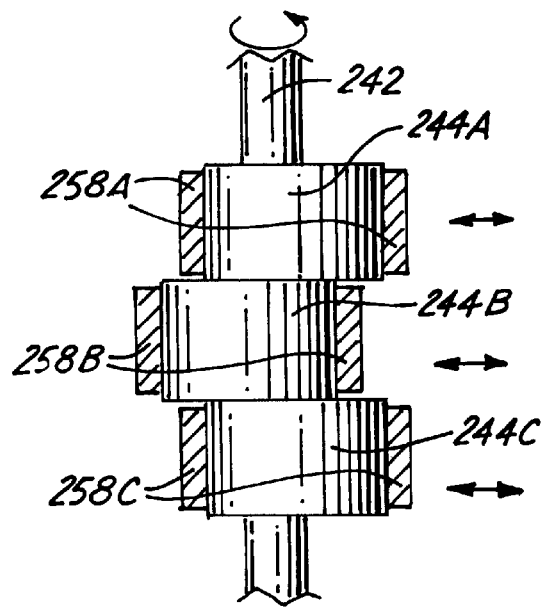
FIG. 8 is a fragmentary, cutaway, side view of the cams and camshaft of FIG. 7, disposed between the cutaway control arms.
Figure 9:
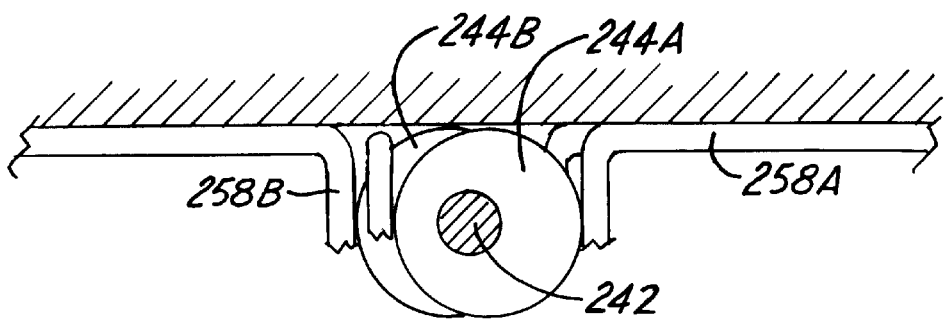
FIG. 9 is a fragmentary, top, cutaway view of the cam shaft of FIG. 8.

Referring now to FIGS. 8 and 9, vertical camshaft 242 is shown having cams 244A 244B, and 244C attached to the camshaft. Control arm arcuate portions 258A, 258B, and 258C, shown in cutaway, may be seen to have their respective positions determined by the position of the enclosed cam. The rotation of camshaft 242 thus determines the configuration of the respective cams, and translates the enclosing cam follower elements or control arms left and right depending on the configuration of the cams and the degree of rotation of camshaft 242.

Figure 10:
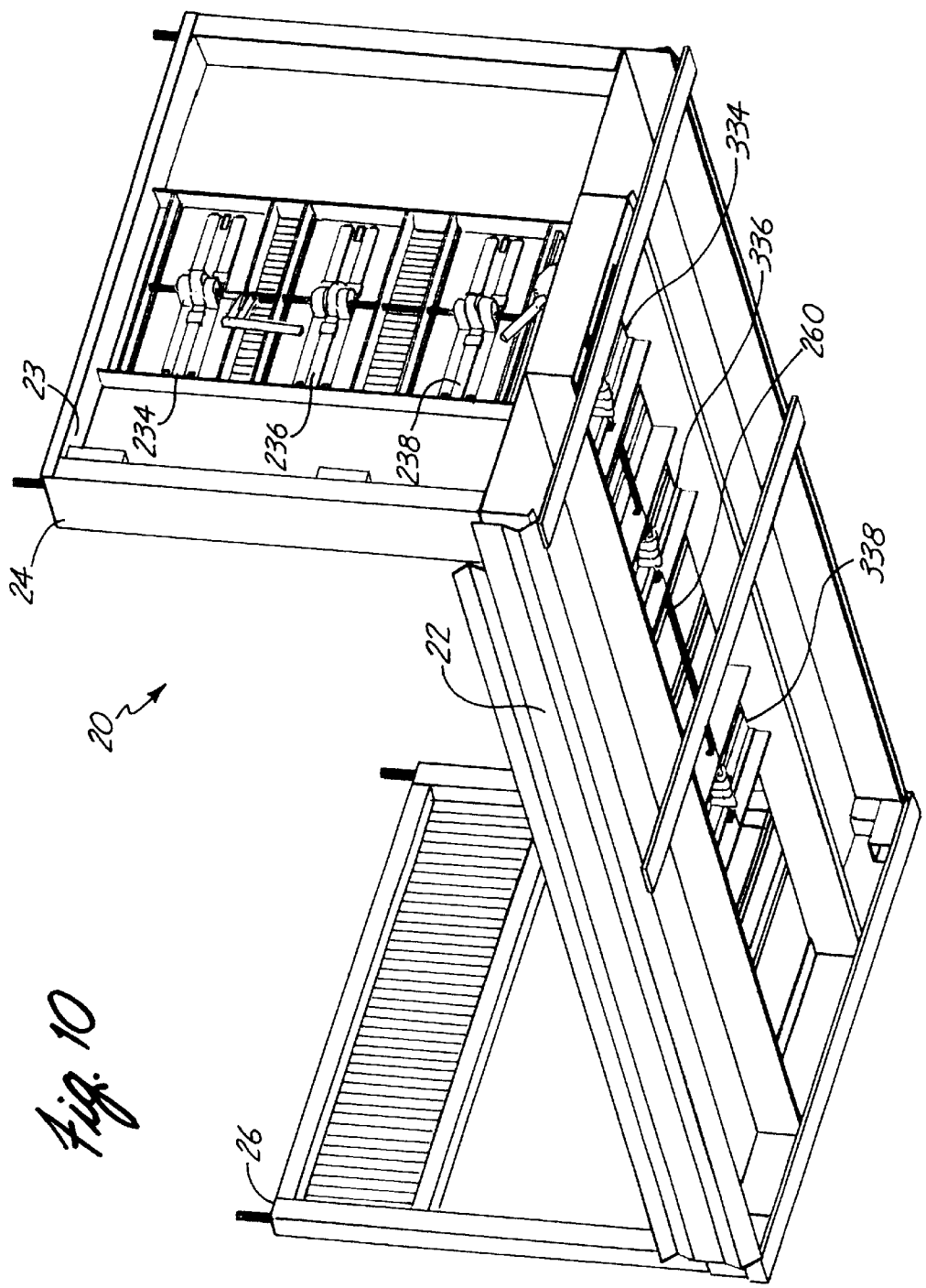
FIG. 10 is a bottom, rear, perspective view of the frame and control assemblies of the shipping container of FIG. 1.

Referring now to FIG. 10, shipping container 20 and frame 23 are illustrated in a bottom, perspective view. Container 20 includes a floor 22, a rear wall 24, and a front wall 26, as previously described. Control assemblies 234, 236, and 238 are as previously described. A horizontal, lower camshaft 260 may be seen to control assemblies 334, 336, and 338 for opening and closing the grippers of the floor of shipping container 20.

An exemplary, non-limiting use of one rack embodiment may now be described. Handles 250 and 262, illustrated in FIG. 6A, may be swung to an open position, to open the grippers in the floor and side wall. Panels, which can be glass sheets of various sizes, may have their peripheral edges disposed within the slots in the floor and rear wall. The slots in the rear wall can provide support against swaying for one vertical edge each various size sheets. This support can be provided even in racks not having any moveable grippers along the rear wall. The rack can be populated with numerous glass sheets, all preferably urged against the corner intersection of the floor and rear wall. In some methods, the height of the panels is limited to be less than the height of the rear wall and front walls. A glass rack having sufficiently short glass panels can have other racks stacked on top of it. After inserting the panels into the rack, the handles can be swung to a closed position, to close the grippers on the panel peripheral edges disposed within the grippers. The rack may then be moved, for example, with a forklift, to a truck for further transportation. After arriving at the desired location, the rack can be removed from the truck with a forklift, the handles swung to the open position, and the panels removed.

What is claimed is:

1. A rack to support a plurality of panels therein, the rack having a back and a floor at right angles to the back, the back and floor each having a plurality of slots adapted to receive the peripheral bottom and side edges of the respective plurality of planar panels, the slots on the back or the floor or both comprising, a plurality of grippers moveable perpendicularly to the slots to capture and support peripheral edges of the panels therein, and means for moving the grippers between an open position enabling removal of the panels from the slots, and a closed position in which the panels are supported in the slots.

2. A rack as in claim 1, wherein the means for moving the grippers includes means for simultaneously moving multiple grippers between the open and closed positions.

3. A rack as in claim 1, wherein the floor slots are disposed within regions having immobile side walls and also disposed within the grippers.

4. A rack as in claim 1, wherein the back slots are disposed within regions having immobile side walls and also disposed within the grippers.

5. A rack as in claim 1, wherein the grippers have at least one moveable holding member each on opposite sides of the slot extending through the gripper, wherein each of the moveable holding members are moveable with respect to the rack.

6. A shipping container for shipping a plurality of parallel, rectangular panels, the container comprising a floor and a rear wall lying in generally perpendicular planes and providing a support structure for bottom panel edges and adjacent side panel edges, respectively, the support structure comprising a first plurality of spaced grippers movable in unison between a first gripping position in which the grippers supportively grip surfaces of the panels adjacent their edges and a second, non-gripping position.

7. The shipping container of claim 6 including a second plurality of spaced grippers movable in unison between a first gripping position in which the grippers supportively grip edges of the panels and a second, non-gripping position, each of the second plurality of grippers gripping surfaces of the panels adjacent their edges that are opposed to the surfaces of the panels gripped by the first plurality of grippers.

8. A shipping container for shipping a plurality of parallel, rectangular panels, the container comprising a floor and a rear wall lying in generally perpendicular planes and providing support structures for bottom panel edges and adjacent side panel edges, respectively, the support structure comprising a first plurality of spaced grippers movable in unison in one direction from a first gripping position in which the grippers engage one surface of each of the panels adjacent its edges to a second, non-engaging position, and a second plurality of grippers movable in unison in a direction opposite to said one direction from a first position in which the second plurality of grippers grip the opposed surface of each of the panels adjacent their edges to a second, non-engaging position.

9. A shipping container for holding a plurality of parallel panels, wherein the panels have a length dimension, a height dimension, and a width disposed orthogonally to the length and height dimensions, the panels having parallel major surfaces terminating at peripheral side edges, the shipping container comprising:

a floor having a length defining a longitudinal dimension;

a generally upright rear wall having a height defining a vertical dimension; and a frame supporting the floor and rear wall in planes that intersect at approximately a right angle for vertically supporting the plurality of parallel panels with the edges of the panels being supported by the floor and rear wall, respectively, the panels being supported in parallel, spaced planes that are perpendicular to the planes of the rear wall and the floor;

the floor having a first plurality of bottom grippers having parallel grooves therein for receiving the panel edges, the first plurality of bottom grippers being disposed transversely relative to the longitudinal dimension, the bottom gripper grooves being oriented along the longitudinal dimension, the bottom grippers having a relaxed position for permitting removal of the panels and a gripping position for inhibiting movement of the panels, wherein the bottom grippers grip the panels about the peripheral side edges.

10. A shipping container as in claim 9, wherein the floor includes a plurality of bottom grooves oriented along the longitudinal dimension, the bottom grooves having groove walls, wherein the bottom grippers include a first plurality of upwardly protruding holding members slidably disposed along the transverse direction, wherein the floor further includes a second plurality of bottom holding members slidably disposed transversely to the plurality of bottom grooves and received panel edges, wherein the first and second plurality of bottom holding members are disposed on opposite sides of the panel edges, wherein the first and second bottom holding members are disposed closer together in the gripping position than in the relaxed position, wherein the first and second plurality of holding members are both moveable relative to the floor.

11. A shipping container as in claim 10, wherein the first plurality of bottom holding members are coupled to a first transverse bottom carrying member transversely and slidably disposed relative to the floor, wherein the second plurality of bottom holding members are coupled to a second transverse bottom carrying member transversely and slidably disposed relative to the floor, wherein the first and second transverse bottom carrying members have a relaxed position for urging the bottom holding members into the relaxed position and a gripping position for urging the bottom holding members into the gripping position.

12. A shipping container as in claim 11, wherein the first and second transverse bottom carrying members are operably coupled to a longitudinally disposed cam shaft, wherein the first transverse bottom carrying member is operably coupled to a first cam and the second transverse bottom carrying member is operably coupled to a second cam, wherein the first and second cams are carried on the longitudinally disposed cam shaft, such that rotating the cam shaft in a first direction urges the first and second transverse bottom carrying members to the relaxed position and rotating the first cam shaft in a second direction urges the first and second transverse bottom carrying members to the gripping position.

13. A shipping container as in claim 11, wherein the floor further includes a third plurality of bottom holding members slidably disposed along a direction transverse to the first plurality of bottom grooves and received panel edges, wherein the second and third plurality of bottom holding members are disposed on opposite sides of the panel edges, and the second and third bottom holding members are disposed closer together in the gripping position than in the relaxed position.

14. A shipping container as in claim 13, wherein the first plurality of bottom holding members are coupled to a first transverse bottom carrying member transversely and slidably disposed relative to the floor, wherein the second plurality of bottom holding members are coupled to a second transverse bottom carrying member transversely and slidably disposed relative to the floor, wherein the third plurality of bottom holding members are coupled to a third transverse bottom carrying member transversely and slidably disposed relative to the floor, wherein the first, second and third transverse bottom carrying members have a first position for urging the bottom holding members into the relaxed position and a second position for urging the bottom holding members into the gripping position.

15. A shipping container as in claim 14, wherein the first, second and third transverse bottom carrying members are operably coupled to a longitudinal disposed camshaft, wherein the first transverse bottom carrying member is operably coupled to a first cam, the second transverse bottom carrying member is operably coupled to a second cam, and the third transverse bottom carrying member is operably coupled to a third cam, wherein the first, second, and third cams are carried on the longitudinally disposed camshaft, such that rotating the longitudinal camshaft in the first direction urges the first, second, and third transverse bottom carrying members to a relaxed position and rotating the longitudinal camshaft in a second direction urges the first, second, and third transverse bottom carrying members to the gripping position.

16. A shipping container as in claim 9, wherein the rear wall has a first plurality of side grippers having parallel side grooves therein for receiving the panel edges along the panel height, the first plurality of side grippers being disposed along a direction transverse to the side grooves, the first plurality of side grippers having a relaxed position for permitting removal of the panels and a gripping position for inhibiting movement of the panels.

17. A shipping container as in claim 16, wherein the side grooves have groove walls, wherein the side grippers include a first plurality of protruding side holding members slidably disposed along the transverse direction, wherein the rear wall includes a second plurality of side holding members slidably disposed along a direction transverse to the first plurality of side grooves and received panel edges, wherein the first and second plurality of side holding members are disposed on opposite sides of the panel edges and the first and second side holding members are disposed closer together in the gripping position than in the relaxed position.

18. A shipping container as in claim 11, wherein the bottom holding members are more pliable and resilient than the transverse bottom carrying members.

19. A shipping container as in claim 9, further comprising a generally upright removable front wall disposed opposite the rear wall, wherein the rear wall is adapted to receive at least part of the front wall therein for extending the height of the rear wall.

20. A shipping container for holding a plurality of parallel panels, wherein the panels have a length dimension, a height dimension and a width disposed orthogonally to the length and height dimensions, the panels having parallel major surfaces terminating at peripheral side edges, a shipping container comprising:

a floor; and a generally upright rear wall, the floor and rear wall being disposed to intersect at approximately a right angle to each other for vertically supporting the plurality of parallel panels with the edges of the panels being supported by the floor and rear wall, the panels being supported in parallel planes that are perpendicular to the planes of the rear wall and the floor;

the floor having a first plurality of means for releaseably holding the received panel edges, the first means for releasably holding the panels having a relaxed position for permitting removal of the panels and a gripping position for inhibiting movement of the panels by gripping the panels adjacent the panel edges, wherein the means for releasably holding the panels can be switched between the relaxed and gripping positions for multiple panels simultaneously.

21. A shipping container as in claim 20, wherein the rear wall includes a second plurality of means for releasably holding the panel edges, the second plurality of means for releasably holding the panels having a relaxed position for permitting removal of the panels and the gripping position for inhibiting movement of the panels.

22. A shipping container as in claim 20, wherein the rear wall and floor each contain a plurality of grooves therein for receiving the panel edges.

23. A shipping container as in claim 21, wherein the floor includes a first plurality of stationary grooves for receiving the panel edges and the rear wall includes a second plurality of stationary grooves for receiving the panel edges.

* * * * *